Sept. 18, 1945.  C. E. KOLIAS  2,385,285
AUTOMOBILE THEFT INDICATOR AND HOOD LOCK
Filed Sept. 16, 1944  3 Sheets-Sheet 1
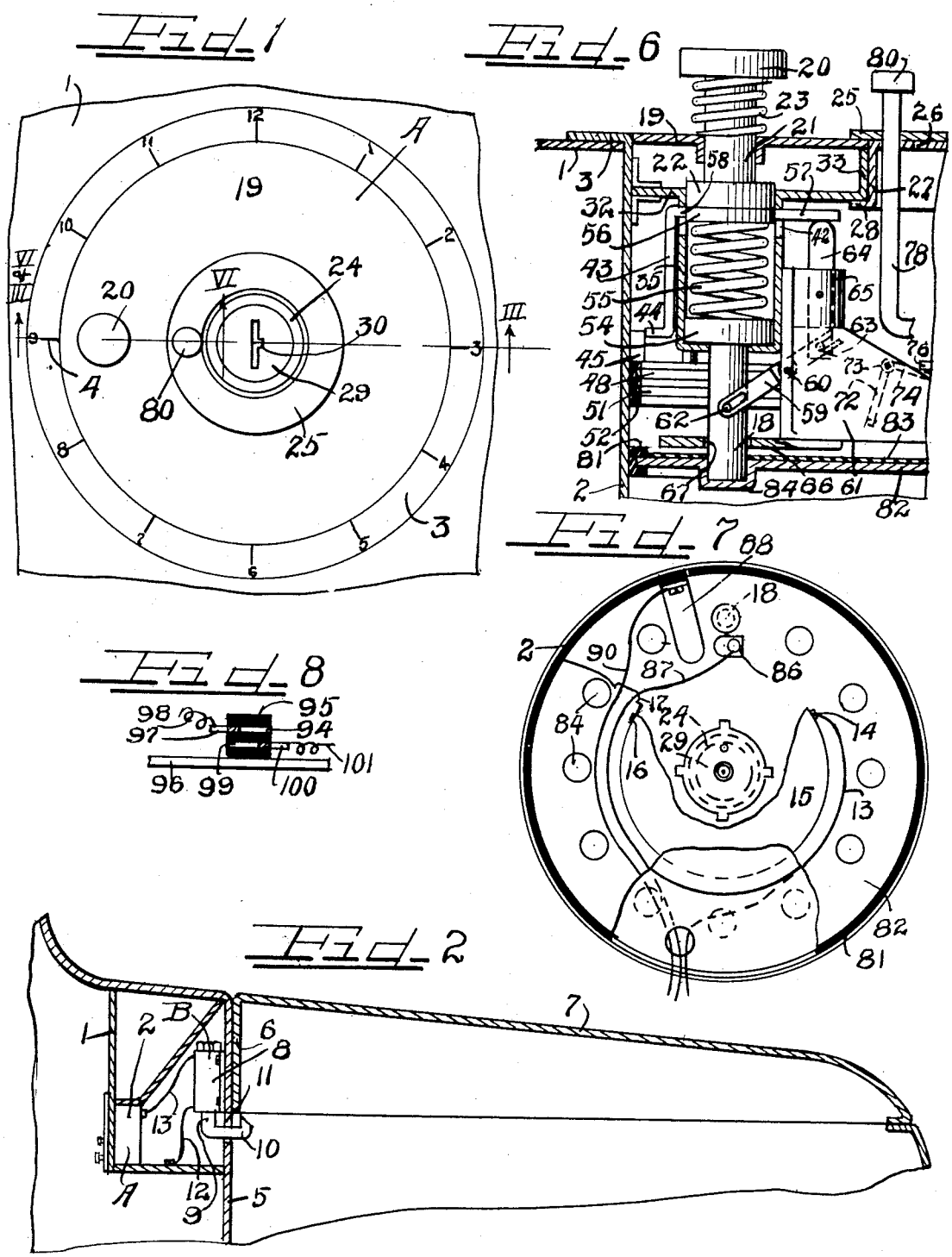
Inventor
Christ E. Kolias Sept. 18, 1945.   C. E. KOLIAS   2,385,285
AUTOMOBILE THEFT INDICATOR AND HOOD LOCK
Filed Sept. 16, 1944   3 Sheets-Sheet 2
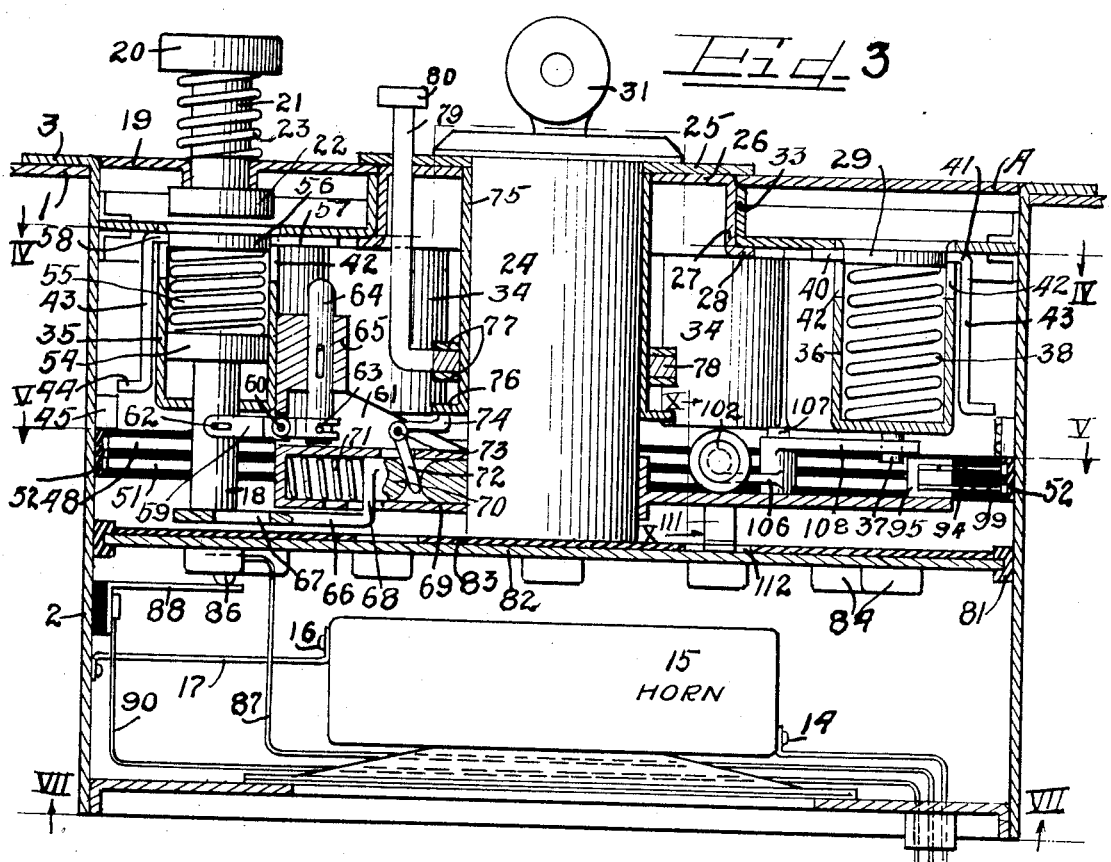
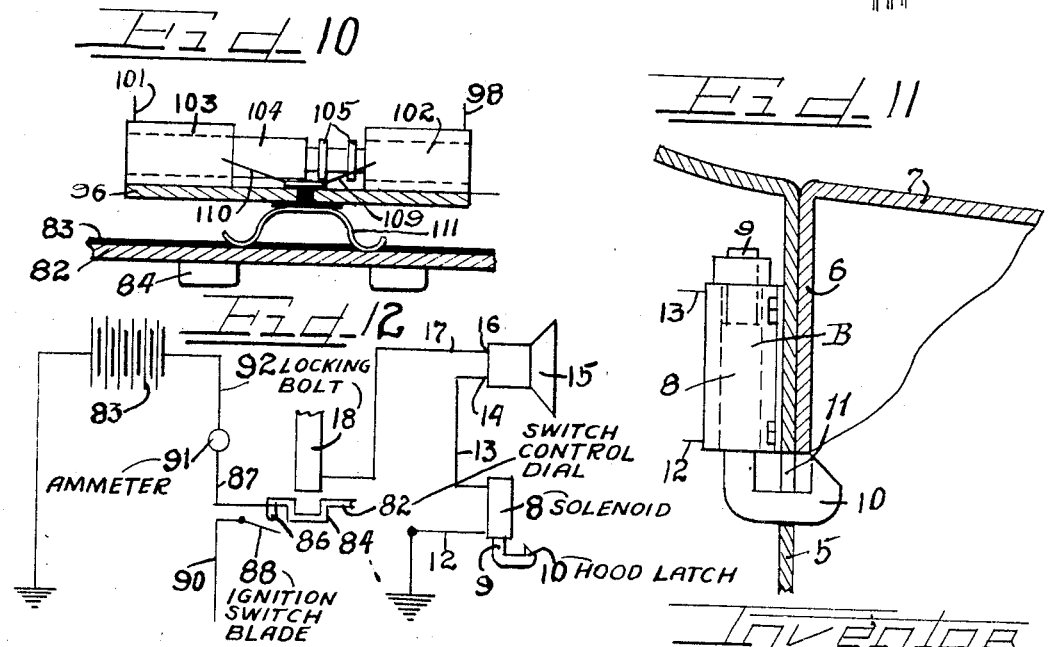
Inventor
Christ E. Kolias

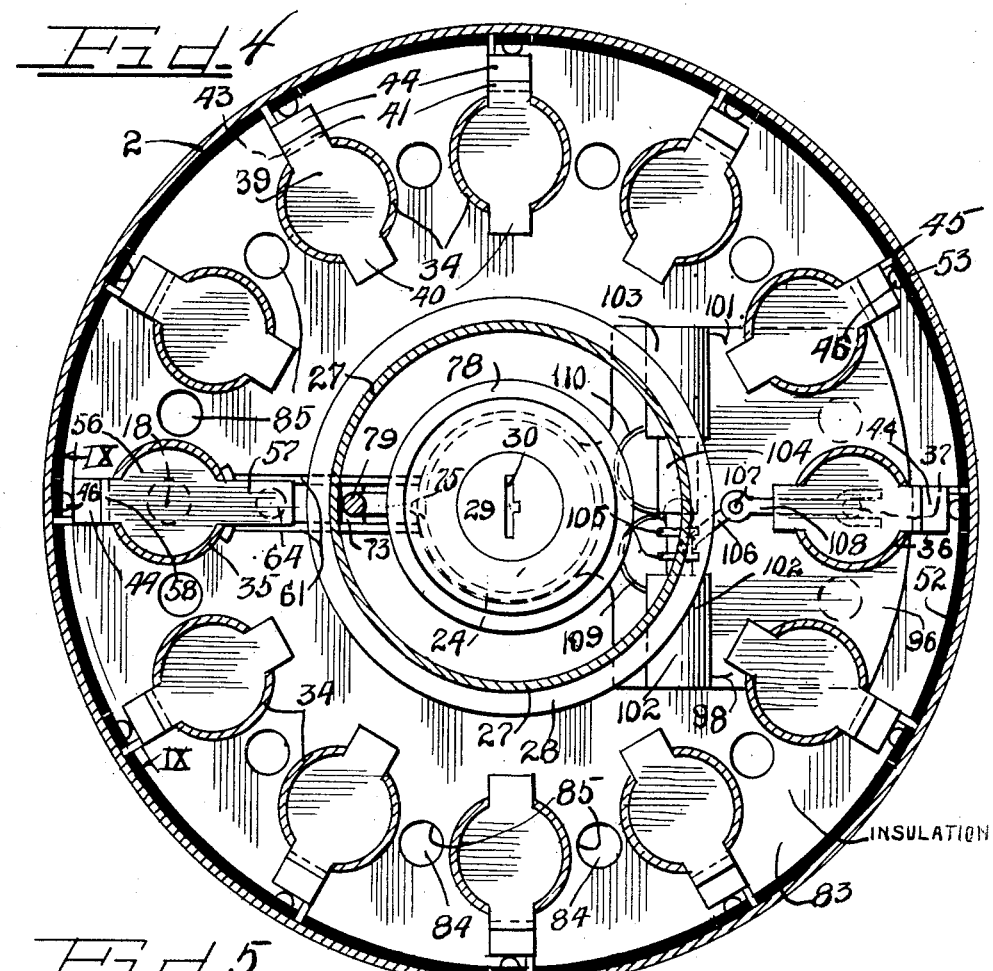

Patented Sept. 18, 1945

2,385,285

UNITED STATES PATENT OFFICE 2,385,285

AUTOMOBILE THEFT INDICATOR AND HOOD LOCK

Christ E. Kollas, Chicago, Ill.

Application September 16, 1944, Serial No. 554,373

11 Claims. (Cl. 177—314)

This invention relates to an automobile protective device and more particularly to a combination automobile theft indicator and hood lock employing a key operated ignition switch mechanism. The improved indicator and lock is adapted for mounting on an automobile instrument board or panel and has the automobile ignition switch lock supported therein and connected therewith so that if an unauthorized person should attempt to steal the automobile a continuous audible signal is set in operation and the automobile hood is automatically locked when the ignition lock is operated by means of a key or an improvised implement, or by the independent operation of any one of a plurality of auxiliary control units, resulting in the disabling of the ignition switch mechanism, the setting in operation of a continuous audible signal and the simultaneous locking of the automobile hood thereby preventing access to the indicator and the connections thereof from under the hood.

It is an object of this invention to provide a combination alarm device and lock to prevent the theft of automobiles, and it is described as being applied to automobiles although it may be adapted to other applications requiring both the sounding of a theft signal and the operation of a lock preventing access from the rear to the working parts of the device.

Another object of the invention is to provide a protective device for giving an automatic signal in an attempt to move an automobile by an unauthorized person and furthermore to provide a means for simultaneously locking the automobile hood to prevent tampering with the device when the continuously operating audible signal is set in operation.

Another object of the invention is to provide a vehicle theft indicator including an alarm mechanism and a locking means, the simultaneous operation of which is governed by the selective setting of control mechanisms adapted to be released by the operation of any one of a plurality of controls or by the turning on of the vehicle ignition switch having the lock portion thereof connected with the indicator and the control mechanisms thereof.

It is furthermore an object of this invention to provide a combination vehicle alarm indicator and lock adapted to be conveniently mounted within an automobile and connected with the battery thereof, said device including an alarm, an auxiliary locking unit and a plurality of rotatable dials for selectively setting auxiliary switch mechanisms adapted to be closed in sequence when the ignition switch lock of the automobile is operated or when secondary controls are tampered with by an anauthorized person attempting to steal the automobile, said operation of the ignition lock or one of the secondary controls causing continuous operation of the alarm and the operation of the locking unit, which devices can only be shut off by a person knowing the release combination for which the indicator mechanism was set.

A further object of the invention is the provision of an automobile theft indicator and lock unit adapted to be associated with the automobile ignition switch lock and including a plurality of switch mechanisms adapted to be set and controlled by a plurality of rotatable dials or by the operation of secondary controls to simultaneously cause disabling of the ignition switch lock, the operation of an audible alarm and the closing of a locking unit when either the ignition switch lock is turned on or a secondary control is operated by an unauthorized person, said audible alarm and the locking unit adapted to be respectively shut off and unlocked and the disability of the ignition switch lock removed only by the release of a master control by a person familiar with the proper setting and release of the device.

It is an important object of this invention to provide a combination safety alarm device and a locking means for motor vehicles, of simple, durable and effective construction, whereby the objects contemplated are obtainable.

Other and further important objects of this invention will be apparent from the disclosures in the specification and the accompanying drawings.

In the drawings:

Figure 1 is a fragmentary front view of an automobile instrument board or panel equipped with an improved automobile theft control device embodying the principles of this invention and having the automobile key operated ignition switch lock associated therewith.

Figure 2 is a fragmentary vertical sectional view through the hood portion of an atuomobile showing the alarm unit of the device mounted on the vehicle instrument panel and connected with the hood locking unit.

Figure 3 is an enlarged vertical detail section of the indicator control unit taken on the line III—III of Figure 1, with parts shown in elevation with the operating knob, the spring controlled main combination switch unit and locking member, the control bolt, and the operating means therefor all in normal positions set to permit the automobile ignition switch lock unit to be operated by means of an ignition key to permit an authorized person to start and operate the machine without disabling the ignition switch lock, setting off the audible alarm or causing closing of the hood control lock.

Figure 4 is a transverse sectional view taken on the line IV—IV of Figure 3.

Figure 5 is a fragmentary transverse sectional view taken on line V—V of Figure 3 showing the control bolt mechanism for holding the main locking member or stem in normal elevated position and also illustrating the dual solenoid controlling means and switch connections therefor.

Figure 6 is an enlarged fragmentary detailed section taken on the line VI—VI of Figure 1 with parts shown in elevation with the operating knob partially depressed ready to be further actuated by an authorized person knowing the combination to cause release of the main combination switch unit and locking member from locking position in which it causes continuous operation of the audible alarm, locking of the hood lock unit, and disabling the automobile ignition switch lock to prevent the same from being turned off until an authorized person knowing the combination can restore parts to normal position.

Figure 7 is a reduced interior fragmentary view of the bottom portion of the indicator unit taken on the line VII—VII of Figure 3 with the audible alarm unit base and part of the bottom plate omitted.

Figure 8 is a fragmentary detail view of the dual solenoid control switch and taken on line VIII—VIII of Figure 5.

Figure 9 is a fragmentary sectional view taken on line IX—IX of Figure 4 illustrating the multiple arrangement of the auxiliary sets of contacts and the contact rings with which the dual solenoid control switch coacts.

Figure 10 is a fragmentary detail sectional view taken on line X—X of Figure 3 illustrating portions of the dual solenoid control unit.

Figure 11 is a detailed elevational view of the automobile hood control lock mounted on a portion of the automobile and showing the arrangement of the latch bolt for use in locking the hood when the main indicator control unit is tampered with.

Figure 12 is a schematic form of wiring diagram controlling the audible signal and the hood lock.

As shown on the drawings:

The improved, selectively operable, combination audible theft indicator and vehicle hood lock is adapted for use on automobiles and the like, and is equipped with a key operated ignition switch lock and secondary controls to prevent operation of the automobile by unauthorized persons.

The improved device is provided for the purpose of obviating theft or running of an automobile by unauthorized persons. It furthermore includes an arrangement whereby a hood lock arrangement is included in the combination, so that a continuously operable audible signal or alarm is set off simultaneously with the operation of the hood lock by the turning on and the simultaneous locking of the ignition switch lock of the automobile when the device has been pre-set, so that the ignition lock is disabled and cannot be turned off again unless the combination is released. The device is such that it is also adapted to simultaneously operate the audible alarm and the hood lock when an unthorized person, even without attempting to operate the automobile ignition switch lock, tampers with the combination by operating a main setting dial and a control knob as hereinafter more fully described, and resulting in the operation of the audible alarm, the closing of the hood lock and in addition the disabling of the ignition switch mechanism of the automobile so that the same cannot be operated by the ignition key.

The automobile ignition switch lock is associated with the alarm unit of the indicator which is mounted on the instrument panel or board 1 which is provided with an opening for receiving the indicator housing or casing 2. The casing 2 is formed with an outer or front flange 3 having a graduated or divided scale or index 4 thereon, the division marks of which are numbered or may be designated by letters or other suitable symbols to facilitate a selective setting of the indicator mechanism to permit release of the main locking control, by an authorized person, after the device has been tampered with by an unauthorized person resulting in the simultaneous locking of the ignition switch lock, the operation of the audible alarm and the locking of the hook lock.

The automobile protecting device consists of a main audible alarm or indicator unit, designated A, which is preferably mounted on the instrument panel 1 of the automobile and has connected therewith an auxiliary hood lock unit B. The unit B, as shown in Figure 2, is mounted on the front end wall 5 of the automobile body against one face of which the wall 6 of the automobile hood 7 is adapted to be positioned when the hood is closed to permit locking of the hood to prevent access to the engine and other mechanisms and to prevent tampering with the instruments and the wiring therefor from the rear of the automobile instrument panel.

As clearly illustrated in Figures 2 and 11 the auxiliary hood lock unit of the theft prevention device consists of a solenoid 8 including a solenoid core 9, the lower end of which is formed to provide a hook-shaped latch 10 which projects through an opening 11 in the end wall 5. When the solenoid is energized, the latch 10 will be drawn upwardly to engage the hood wall 6 and thereby lock the hood in a closed position. Connected to one terminal of the solenoid coil is a wire 12 which is also connected to ground. The second terminal of the solenoid coil is connected by means of a wire 13 to the terminal 14 of an audible signal or alarm in the form of a horn 15 (Figure 3). The second terminal 16 of the horn 15 has one end of a wire 17 connected therewith. The other end of the wire 17 is connected to the casing 2 and thereby to a main locking bolt or stem 18 mounted within the casing 2 and forming a part of a combination switch and lock unit controlling the operation of the main audible alarm unit forming part of the indicator device.

The control mechanisms which govern the simultaneous operation of the horn 15 and the hood lock unit B, are contained within the casing 2. Mounted in the front or outer end of the casing 2 is a rotatable first control dial or setting disk 19 which serves as a closure for the casing. Slidably mounted in a sleeve forming a part of the dial 19 is a double headed operating knob comprising an outer head 20, a shank 21 and an inner head 22. Engaged around the control knob stem 21 between the dial 19 and the head 20 is a coiled spring 23 which acts to normally hold the control knob in the elevated position illustrated in Figure 3. The control knob mechanism is used to cause rotation of the first control dial 19 into a selected position, to permit an authorized person, knowing the release combination, to reset the mechanism to stop an audible alarm and open the hood lock after the same have been operated resulting from the tampering with the set indicator mechanism by an unauthorized person endeavoring to steal the automobile, by either operating the automobile ignition lock with a key or by selectively operating a multiple type secondary control mechanism of the indicator without turning on the ignition lock and without knowing the release combination of the indicator device.

The automobile ignition switch lock unit is mounted axially within the indicator casing 2 as shown in Figure 3, and consists of a stationary cylindrical ignition switch lock case or housing 24 having a top flange which is rigidly secured to a stationary top plate or disk 25. Rigidly secured to the bottom surface of the top plate 25 is an inner stationary plate 26 provided with an inwardly directed circular rim 27 provided with an integral flange 28. Rotatably mounted within the ignition switch lock case 24 is a switch lock barrel 29 provided with the customary key slot 30 for the reception of a key 31 for turning the ignition switch on and off.

Rotatably mounted within the indicator casing 2 is a second dial or switch control disk 32 which is rotatably supported on the flange 28 and is formed with an integral collar 33 which is rotatably disposed around the rim 27. The outer margin of the second control dial 32 is rotatably engaged in a guide slot provided in a circular guide secured to the inner surface of the upper portion of the indicator casing 2 as shown in Figure 3. Integrally formed in the second control dial 32 is a ring consisting of spaced dummy wells or pockets 34, a single master well or pocket 35 having an opening in the bottom or inner end thereof, and an auxiliary control well or pocket 36. As clearly illustrated in Figure 4 there are ten of the dummy pockets 34 separated into two groups by the diametrically positioned master pocket 35 and the auxiliary control pocket 36. While ten dummy wells or pockets 34 are illustrated and described, it is to be understood that any number of dummy pockets may be used. Projecting axially from the closed bottom of the auxiliary control pocket 36 is a pin or stud 37. Engaged in each of the pockets 34 and in the auxiliary pocket 36 is a coiled spring 38 having supported on the upper end thereof a disk or plate 39 having integral diametrically opposite guide lugs or fingers 40 and 41 which are positioned to move in vertical guide slots 42 provided in the upper portion of each of the pockets 34, 35 and 36. Integrally formed on the outer finger 41 of each of the plates 39 is a downwardly projecting contact or switch arm 43, the lower end of which is deflected to provide a contact tip 44.

The various contact tips 44 are provided for coaction with a plurality of groups or sets of control contacts for governing the operation of a multiple type solenoid control unit whereby the main control switch mechanism of the indicator may be closed, independently of the use of an ignition key, to simultaneously cause diabling of the ignition switch lock, operation of the audible signal and locking of the vehicle hood when the device is tampered with.

As clearly illustrated in Figure 9, each set of the control contacts includes a grounded contact bar 45 secured to the inner wall of the indicator casing 2 and a contact terminal 46 connected, by a connecting bar 47, to an upper contact ring 48. Also included in each of the sets of contacts is a lower contact terminal 49 which is connected by means of a connecting bar 50 to a lower contact ring 51. The contact terminals 46 and 49, the connecting bars 47 and 50 and the upper and lower contact rings 48 and 51 are all mounted in an insulation band 52 and on upwardly projecting insulation arms 53 forming a part thereof. The insulation band 52 is rigidly mounted on the inner surface of an upper or outer chamber of the indicator casing 2 so that the contact terminals 46 and 49 may be selectively brought into contact with the respective contact bars 45 by any one of the contact tips 44 when a selected one of the plates 39 is pushed downwardly in its pocket against the action of the supporting spring 38, and when the operating knob on the first control dial 19 is moved, by means of the head 20, into register with one of the pockets and is depressed.

Disposed within the master pocket 35 and slidably projecting through the opening in the bottom of said pocket is the main locking bolt 18 having integrally formed on the upper or inner end thereof a head 54. Seated within the master pocket 35 upon the bolt head 54 is a coiled spring 55, the upper end of which engages against the bottom surface of a slidable master disk or plate 56. The plate 56 is provided with an inwardly projecting guide and release operating arm 57, and an oppositely projecting guide lug or finger 58 which are positioned to move slidably within the slots 42 of the master pocket 35. The guide finger 58 is provided with an integral downwardly projecting contact or switch arm 43 having a contact tip 44 on the lower end thereof similar to the contact arms of the other pockets.

For the purpose of moving the main control bolt or stem 18 out of a closed contact making position as illustrated in Figure 6, a release mechanism is provided consisting of a forked arm 59 which is fulcrumed intermediate its ends at 60 on a supporting bracket 61. The forked end of the arm 59 is provided with slots to receive pins 62 which project from opposite sides of the main locking bolt 18 to permit raising of the same from a locked to a released position. The opposite end of the arm 59 is notched to engage over a pin 63 carried on the lower portion of a release rod 64 which is slidably mounted in a sleeve 65 forming part of the bracket 61. The release rod is provided with a slot through which a pin engages to limit the sliding movement of the rod 64. The upper projecting end of the release rod 64 is rounded and is positioned beneath the arm 57 of the plate 56, so that when the plate 56 is forced downwardly by the control knob, from the position illustrated in Figure 6, the release arm 57 will push the operating arm 64 downwardly thereby causing the fulcrumed arm 59 to swing the main locking bolt 18 from its lower position on Figure 6 into its upper release position as shown in Figure 3.

For the purpose of holding the main locking bolt 18 in the normal raised position of Figure 3 a latch bolt or stop plate 66 is mounted within the casing 2 and is provided with an opening 67 through which the main latch bolt 18 is adapted to project downwardly into locking or contact making position when the latch bolt 66 is shifted from the position illustrated in Figure 3 by the operation of a setting mechanism. One end of the latch bolt 66 is turned upwardly to form an arm 68 which projects upwardly through a slot in the bottom of a guide sleeve 69. The latch bolt arm 68 is provided with a rounded head or button 70, behind which a coiled spring 71 is engaged and acts to normally hold the latch bolt in the retracted normal position shown in Figure 3 to support and provide a stop for the main switch and locking bolt 18. The spring 71 also acts to hold the latch bolt head 70 in engagement with a lower finger 72 which projects upwardly through a slot in the sleeve 69 and is integrally formed on a collar 73 to which an operating finger 74 is integrally secured or formed at an angle to the finger 72. The members 72, 73 and 74 form an angled control or rocker unit whereby the latch bolt 66 may be actuated against the action of the spring 71 by a setting means cooperating with the angled control to cause the shifting of the bolt 66 and lowering of the combination switch and lock bolt into a set position.

The indicator setting mechanism consists of a sleeve 75 engaged around the ignition switch lock case 24 and slidable thereon to permit a bottom flange 76 of said sleeve to contact the finger 74 of the pivoted angle member as shown in Figure 3. Engaged around the slidable sleeve 75 between spaced flanges 77 is a ring 78 having integrally connected radially at one side thereof the lower end of a plunger rod 79 provided with an operating head 80. The plunger rod 79 projects upwardly out of the casing through openings in the plates 25 and 26 to permit operation of the setting mechanism.

To permit the indicator setting mechanism to be set by an owner of a car when leaving the same, it is only necessary to push downwardly on the setting head 80 to cause downward movement of the sleeve 75 whereby the flange 76 will operate the pivoted two armed angle member or rocker to cause the finger 72 to swing outwardly thereby sliding the setting bolt 66, against the action of the spring 71, from the normal position shown in Figure 3 into the position shown in Figure 6, in which the latch bolt opening 67 is brought into register with the bottom of the main switch and locking bolt 18. The master control unit spring 55 forces the bolt 18 downwardly so that the lower end thereof rests upon a rotatable third control unit mounted within the casing 2.

The third control unit of the indicator is rotatably disposed within the casing 2 in a suitable installation guide support 81 and comprises a metal main switch control dial 82 having rigidly secured to the top surface thereof an insulation cover disk 83. The main control dial 82 with its insulation cover disk is rigidly secured to the bottom or inner end of the ignition switch lock barrel 29 to permit the same to be partially rotated thereby when the lock barrel is rotated by means of the ignition key 31. The main control dial 82 is formed with a circle of spaced cups 84 which register with a ring of openings 85 in the insulation cover disk 83. When the third or main switch control dial 82 is partially rotated by means of the ignition key 31, one of the cups 84, and its registering opening 85 in the disk 83, is moved into position to register with the partially lowered or set main locking bolt 18, thereby permitting the spring 55 to force the main latch bolt 18 into the registering cup 84 thereby not only closing the secondary or auxiliary switch to simultaneously cause continuous operation of the horn 15, closing of the hood latch 10, but also cause locking of the second dial 32 and the third or main dial 82 against rotation with respect to one another, so that the automobile ignition switch lock is disabled so that it cannot be turned off without knowledge of the combination for which the indicator is set. When the main latch bolt 18 is dropped into contact with one of the cups 84 the automobile ignition or main switch is also closed.

The automobile ignition switch mechanism consists of a contact or terminal button 86 which is mounted on the underside of the main switch control dial 82 and has one end of a wire 87 connected thereto. The other end of the wire 87 is connected to an ammeter 91. The main switch terminal button 86 is so located that when the main switch control dial 82 is partially rotated, said terminal button 86 is moved from the open position illustrated in Figure 7 into a closed position to contact a resilient main switch blade 88 which together with the terminal button 86 forms the main or ignition switch of the automobile. The ignition switch blade 88 is mounted on an insulation block secured on the inner face of the lower portion of the indicator casing 2 (Figure 3) and said switch terminal blade has connected therewith one end of a wire 90 which is connected to the automobile starter. The automobile ammeter 91 is connected by means of a wire 92 to the automobile battery 93 as indicated in the wiring schematic of Figure 12.

An authorized person who has set the indicator control mechanism to cause simultaneous disabling of the ignition switch lock, operation of the automobile horn and closing of the hood lock when the ignition switch is turned on by an unauthorized person, must remember the combination in order to be able to unlock the ignition switch lock so that it can again be turned off and at the same time stop the alarm and unlock the hood lock.

To obtain these results, the automobile owner or authorized person, knowing the combination, has only to rotate the first or setting disk 19, by means of the control knob 20, until the control knob registers with the main control pocket 35, which, for example, has been set at the dial mark 9 of the scale 4. The control knob, having been moved into the secret or combination position, is then pushed downwardly compressing the spring 23 and causing the inner head 22 of the control knob to project downwardly into engagement with the master control plate 56 to depress the same and cause the arm 57 thereof to slidably move the rod 64 downwardly from the position shown in Figure 6 to cause the fulcrumed arm 59 to pivot and thereby raise the combination switch and locking bolt 18 into its uppermost position and simultaneously allowing the control spring 71 to slide the latch bolt 66 from the position shown in Figure 6 back into the position shown in Figure 3 to again permit the main locking bolt 18 to seat thereon and at the same time restoring the setting rod 79 to its normal raised position ready to permit resetting of the combination switch and lock bolt when the automobile is parked. The ignition key 31 may now again be turned to remove the disability by opening the ignition switch to stop the engine if the same was in operation.

In case an unauthorized person does not have an ignition key to turn on the automobile ignition lock, but nevertheless attempts to steal the automobile and tampers with the set control device by rotating the top dial 19 by means of the knob 20, he will have to guess the combination and then depress the knob into any one of the dummy pockets 34 or into the auxiliary pocket 36.

A secondary indicator actuating cycle is thus brought into operation since each of the plates associated with the pockets is provided with a contact switch arm 43, which when the plate 39 is depressed by the unauthorized person operating the device, causes the contact tip 44 to first be brought to connect across from one of the contact bars 45 to an upper contact terminal 46 thereby producing a connection through the connecting bar 47 to the top contact ring 48. Slidably engaged with the contact ring 48 is an upper contact plate 94 which is mounted in an insulation block 95 secured upon an extension plate or bracket 96 forming an integral part of the supporting bracket 61. The upper contact plate 94 is provided with a brush-like extension to slidably contact the upper ring 48. Also formed on the upper contact plate is a side extension or finger 97 to which one end of a wire 98 is connected. Also mounted in the insulation block 95 is a lower contact plate 99 having a brush-like extension for frictional contact with the lower contact ring 51. Also integrally formed on the lower contact plate 99 is a side extension or finger 100 to which one end of a wire 101 is connected. The two wires 98 and 101 as shown in Figure 5, connect up with a double or tandem type solenoid unit consisting of a primary solenoid 102 and a secondary solenoid 103 mounted in axially aligned relationship with respect to one another and provided with a common or tandem core 104 extending from one solenoid into the other. The core 104 has the middle portion thereof reduced in diameter and is provided with a pair of spaced rings 105 providing a guide groove for the reception of a shifting pin formed on the end of an arm 106. The arm 106 forms a part of a lever mechanism which is fulcrumed at 107 upon the extension plate 96. The fulcrumed lever also includes an arm 108 disposed at an angle with respect to the arm 106 and formed with a forked end to fit around the pin 37 of the auxiliary control pocket 36. A wire 109 is connected to the second terminal of the solenoid 102. Connected to the second terminal of the solenoid 103 is one end of a wire 110. The solenoid wires 109 and 110 extend through an insulation connection provided in the bracket plate 96 (Figure 10) and both of said wires connect up with a contact spring 111 having rounded terminals which resiliently contact the top surface of the main switch control dial 82 through a circular or ring opening 112 provided in the insulation disk 83.

When the indicator control mechanisms are in the normal positions illustrated in Figure 3 after the ignition switch has been turned off and the control dial 82 has been rotated so that the apertures in the insulation disk 83 and the cups 84 are moved out of register with the main control bolt 18, as shown in Figure 4, the double solenoid control mechanism is restored to the normal position illustrated in Figure 5 since the secondary solenoid 103 is deenergized while the solenoid 102 is energized upon the upward or return movement of the master contact tip 44 carried by the plate 56 as it moves into contact with an upper terminal 46 to temporarily close the circuit through the coil of the solenoid 102 to move the fulcrumed lever 106—108 back into normal position.

An owner of a car desiring to leave the same parked may readily set the indicator mechanism by merely pushing downwardly upon the setting button 80 thereby causing the setting bolt 66 to be slidably moved outwardly, compressing the spring 71 and permitting the main latch bolt 18 to move downwardly through the setting bolt opening 67 into seating contact with the top surface of the insulation disk 83 on the dial 82. If an unauthorized person, not having an ignition key, should endeavor to start the automobile by tinkering with the control knob and the first control dial 19, the results will be that the various protective means, forming part of the indicator unit, will be set in operation. This will occur when the unauthorized person, not knowing the combination, rotates the first or upper dial 19 and selects one of the positions on the dial scale 3 and then pushes downwardly on the control knob 20, the inner head 22 will project downwardly into one of the dummy pockets 34 to depress the plate 39 therein, thereby causing the switch arm 43 to move downwardly to cause the contact tip 44 thereof to first move into contact across one of the contact bars 45 and an upper terminal 46. This will not change the position of the mechanisms connected with the double solenoid control unit for the reason that the solenoid 102 is already in the normal position shown in Figure 5. The continued downward movement of the contact tip 44 will, however, come into contact with the lower terminal 49 connected with the lower contact ring 51 thereby closing a circuit through the lower contact plate 99 and the wire 101 through the coil of the secondary solenoid 103 and the wire 110 to battery. Energization of the coil of the secondary solenoid 103 will therefore cause operation of the tandem core 104 to move the same out of the solenoid 102 into the solenoid 103 thereby operating the fulcrumed lever to cause the arm 108 thereof to coact with the pin 37 on the auxiliary pocket 36. The second control dial 32 is thereby rotated causing the shifting of the main latch bolt 18 into register with the first encountered opening 85 in the insulation disk 83, thus permitting the master bolt 18 to drop into the cup 84 associated with the opening 85 to close the circuit through the horn 15 and the hood lock control solenoid 8 to simultaneously start operation of the alarm and at the same time cause the hood lock bolt 10 to be moved upwardly into engagement with the wall 6 of the hood 7 to lock the hood so that access cannot be had to the horn connections or other mechanisms with which the thief might wish to experiment with in attempting to stop the audible alarm.

In addition to starting the simultaneous operation of the horn 15 and the hood lock, when an unauthorized person tampers with the indicator mechanism without having a key, the main control bolt 18 having been dropped into one of the cups 84 of the third rotatable dial 82 locks said dial and the automobile ignition switch lock so that even if a key is used, the ignition switch lock is disabled and cannot be operated. It will thus be seen that in order to stop the alarm, unlock the hood latch and unlock the automobile ignition switch, that it will be necessary for the owner of the car or a person knowing the combination for which the indicator has been set, to operate the control knob 20 to move the same into the combination position so that the knob will register with the master pocket 35, in its set position, so that when the control knob is depressed the master plate 56 will be moved downwardly from the position shown in Figure 6 to cause elevation of the main locking bolt 18, thereby breaking the circuit to the horn and to the hood lock control solenoid and at the same time releasing the ignition switch lock. The various mechanisms are thus restored to the positions shown in Figure 3 and at the same time the spring 71 acts to shift the setting bolt 66 beneath the raised bolt 18 and also restore the setting mechanisms by pushing the setting rod 79 and its operating head 80 upwardly into their normal positions ready to permit resetting of the indicator control mechanisms.

The indicator unit of the automobile protective mechanism herein described, is arranged so that an authorized person or the owner of a car may set the combination so that the main or master control pocket 35 carrying the master locking bolt 18 may be moved to register with any one of the positions on the dial or scale 3. In changing the combination or position of the master locking bolt 18 within the indicator casing 2, it is of course essential that the person setting the combination remembers the same or makes a notation thereof, so that the alarm and locking mechanisms controlled by the indicator device may be shut off and unlocked after an attempted theft of the car.

It will thus be seen that the improved automobile theft indicator and the protective devices of this invention may be used on an automobile, or on any other type of ignition switch controlled vehicle, or on other devices which require protection against the unauthorized starting of the mechanisms thereof.

An owner or authorized person of an automobile equipped with the improved indicator system, after having set the selected combination and operating the setting unit may confidently leave the automobile parked, for the reason that if an unauthorized person should attempt to start the automobile by the use of a duplicate ignition key to turn on the ignition switch lock of the automobile the control mechanisms will immediately be set into operation to cause simultaneous operation of the alarm, locking of the automobile hood and locking of the ignition switch in its turned on position so that it cannot be turned off.

The indicator protective system also includes the secondary or auxiliary protective system whereby even without the use of an ignition key, the alarm may be set into operation, the hood lock may be closed and the ignition switch may be simultaneously disabled in closed position, when an unauthorized person operates the control knob 20 and depresses the same into one of the dummy pockets to cause operation of the tandem solenoid control unit and partial rotation of the third or main control switch dial 82 to permit the previously set main locking bolt 18 to drop into closed position to set the various protective mediums in operation.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. An automobile theft prevention device, including an automobile ignition switch lock, locking means for disabling the normal operation of the ignition switch lock, a plurality of manually operable units, release means connected with the locking means for removing said disability by operating a predetermined one of said units, an audible alarm and a lock device electrically connected in series with the locking means and with one another to be simultaneously set into operation together with the disabling of the ignition switch lock if any one of said units other than said predetermined one is operated, and a bolt mechanism for normally holding the locking means in a normal retracted position to permit operation of the automobile ignition switch lock when the theft prevention device is not set for operation.

2. An automobile theft prevention device, including an automobile ignition switch lock, locking means for disabling the normal operation of the ignition switch lock, a plurality of manually operable units, release means connected with the locking means for removing said disability by operating a predetermined one of said units, an audible alarm and a lock device connected with the locking means and simultaneously set into operation together with the disabling of the ignition switch lock if any one of said units other than said predetermined one is operated, a bolt mechanism for normally holding the locking means in a normal retracted position to permit operation of the automobile ignition switch lock when the theft prevention device is not set for operation, and a setting means connected with the bolt mechanism for moving the same into a position to permit the locking means to be set to cause simultaneous operation of the audible alarm, operation of the lock device and disabling of the normal operation of the ignition switch lock when the ignition switch lock is operated by an unauthorized person and also if any one of said units other than said predetermined one is operated without turning on the ignition switch lock.

3. An automobile theft indicator including in combination an indicator casing for mounting in an automobile, an ignition switch lock mounted in the casing, a plurality of rotatable control dials in the casing with one of said rotatable control dials connected for operation by the ignition switch lock, an audible alarm in the casing, an automobile hood locking means connected with the audible alarm, a switch connecting the audible alarm with the rotatable dial which is operable by the ignition switch lock, and a selectively settable combination control switch and lock mechanism carried by another of said rotatable dials and adapted to be set in a predetermined position for release of the control dial operable by the ignition switch lock to permit the combination control switch and lock mechanism to coact with the dial operable by the ignition switch lock to cause simultaneous operation of the audible alarm, operation of the hood locking means and disabling of the normal operation of the ignition switch lock until the said combination of the combination switch and lock mechanism is released by an unauthorized person knowing the predetermined position for which the indicator is set.

4. An automobile theft indicator including in combination a combination switch and lock mechanism, a casing for containing the same, means for setting said mechanism, an audible alarm in the casing, an automobile hood lock device connected with the audible alarm, a switch device connected with the combination switch and lock mechanism, a source of electrical energy connected with the switch device, and an automobile ignition switch lock mounted in the casing and connected with the combination switch and lock mechanism adapted to be operated to release and permit closing of the combination switch and lock mechanism and also close the switch device simultaneously causing continuous operation of the audible alarm, actuation of the hood lock and locking of the ignition switch lock in open position by the release of the combination switch and lock mechanism.

5. An automobile theft indicator including in combination a combination switch and lock mechanism, a casing for containing the same, means for setting said mechanism, an audible alarm in the casing, an automobile hood lock device connected with the audible alarm, a switch device connected with the combination switch and lock mechanism, a source of electrical energy connected to the switch device, an automobile ignition switch lock mounted in the casing and connected with the combination switch and lock mechanism adapted to be operated to release and permit closing of the combination switch and lock mechanism and also close the switch device simultaneously causing continuous operation of the audible alarm, actuation of the hood lock device and locking of the ignition switch lock in open position, selectively operable means connected with the combination switch and lock mechanism for retracting the same to normal position to stop the audible alarm, to unlock the hood lock device and remove the disability of the ignition switch lock to permit the same to again be turned off and on by the use of the automobile ignition key, and a manually controlled setting mechanism for either holding the combination switch and lock mechanism in a position to permit operation of the ignition switch lock by means of the ignition key or adapted to be set to set the combination switch and lock mechanism to cause automatic closing of the same when either the ignition switch lock is operated by an unauthorized person or if the indicator mechanism is tampered with by an unauthorized person attempting to operate the same without the use of the ignition key.

6. An automobile theft indicator including in combination a combination switch and lock mechanism, a casing for containing the same, an audible alarm in said casing connected with said mechanism, a hood lock unit connected with the audible alarm, a switch device for coaction with said mechanism, a source of electrical energy connected with the switch device and with said mechanism, an automobile ignition switch lock mounted in the casing and adapted to be operated to close the switch device to permit operation of the automobile by an authorized person, and means in the casing for selectively setting the combination switch and lock mechanism to cause simultaneous closing of the switch device, release and closing of said mechanism to lock the switch device, and also cause operation of the audible alarm and the closing of the hood lock unit when the switch ignition lock is turned on or if said means is otherwise tampered with by an unauthorized person, said means being operable to cause opening and retraction of the combination switch and locking mechanism, to unlock and open the switch device, stop the alarm and open the hood lock unit.

7. An automobile theft indicator including in combination a casing, a graduated scale thereon, a first control and setting dial rotatably mounted in the casing, a second control dial rotatably mounted in the casing and adapted to be set by means of said scale, a combination switch and lock element carried by the second dial, an operating knob means carried by the first dial and movable into and out of coacting relationship with the second control dial and with the combination switch and lock element to release the same when in locking position, means for setting the combination switch and lock element, an automobile ignition switch and lock in the casing, a key operated rotatable barrel forming a part of the ignition switch lock, a third control dial rotatably mounted in the casing and secured to the lock barrel for operation thereby, said third dial formed to receive the switch lock element when released to lock the third dial with the second dial and also lock the ignition switch lock barrel against key operation, an audible alarm in said casing connected with said combination switch and lock element, an automobile hood lock unit connected with the alarm, a switch terminal on the third control dial connected to a source of electrical energy, and a grounded switch member in the casing positioned to be contacted by the switch terminal on the third dial when said dial is rotated by operation of the lock barrel or by rotation of the second dial by means of the operating knob means to cause simultaneous locking of the lock barrel, operation of the alarm and locking of the hood lock unit when the third control dial is rotated to move the switch terminal into contact with the switch member to close the circuit to the source of electrical energy by the operation of the lock barrel or by the independent operation of the second control dial by an unauthorized person attempting to steal the automobile.

8. An automobile theft indicator comprising a source of electrical energy, a main control switch including a movable terminal member connected with the source of energy and a grounded stationary terminal, a key operated control for closing and opening the main control switch, a combination auxiliary switch and lock adapted to be connected with said movable terminal member and to said source of electrical energy and releasable into a closed and locked position when the main control switch is closed, an alarm connected with the auxiliary switch and lock, a grounded lock unit connected with the alarm, a rotatable control mechanism for supporting the auxiliary switch and lock, means operable with respect to the rotatable control mechanism to permit the auxiliary switch and lock to be selectively set by an authorized person for secret release when the key operated control is turned on or if the rotatable control mechanism is tampered with by an unauthorized person to cause simultaneous locking of the key operated control of the main control switch, continuous operation of the alarm and closing of the lock unit, and a self-restoring setting device coacting with the combination auxiliary switch and lock to normally hold the same in open position to permit operation of the key operated control to govern closing and opening of the main control switch to permit operation of the automobile by an authorized person, said self-restoring setting device adapted to be operated to cause setting of the auxiliary switch and lock to set the theft indicator in operation when either the key operated control or the rotatable control mechanism is actuated by said means by an unauthorized person.

9. An automobile theft indicator and hood lock device comprising a source of electrical energy, an alarm, a hood lock mechanism connected to the alarm, a main control switch connected to the source of electrical energy and to ground, a key operated control for closing and opening the main control switch, a combination auxiliary switch and lock connected to the main control switch and to said source of electrical energy and releasable by the key operated control when the same is turned on to close both the auxiliary switch and lock and the main control switch to simultaneously cause locking of the key operated control, continuous operation of the alarm and locking of the hood lock mechanism, a movable support for the auxiliary switch and lock, means for selectively moving the support and the auxiliary switch and lock into a secret combination to permit the auxiliary switch and lock to be released and closed by either the operation of the key operated control or by manipulation and operation of said means into coacting relationship with the movable support, and a restoring means connected with the auxiliary switch and lock and operable only with a knowledge of the secret combination to cause opening of the auxiliary switch and lock to unlock the key operated control, stop the alarm, and unlock the hood lock.

10. An automobile theft indicator and hood lock device comprising a source of electrical energy, an alarm, a lock mechanism connected to the alarm, a main control switch connected to the source of electrical energy and to ground, a key operated control for closing and opening the main control switch, a combination auxiliary switch and lock connected to the main control switch and to said source of electrical energy and releasable by the key operated control when the same is turned on to close both the auxiliary switch and lock and the main control switch to simultaneously cause locking of the key operated control, continuous operation of the alarm and locking of the lock mechanism, a movable support for the auxiliary switch and lock, a master control unit on the movable support and connected with the auxiliary switch and lock, a plurality of dummy control units carried by the rotatable support, a secondary control connected to cause closing of the auxiliary switch and lock and closing of the main control switch, means for selectively moving the movable support and the master control unit for the auxiliary switch and lock into a secret combination to permit the auxiliary switch and lock to be released or closed by either the operation of the key operated control or by the operation of any one of the dummy control units, and a restoring means connected with the master control unit and with the auxiliary switch and lock and operable only with a knowledge of the secret combination to cause opening of the auxiliary switch lock to unlock the key operated control, stop the alarm and unlock the lock mechanism.

11. The combination with an automobile ignition switch lock and the ignition switch controlled thereby, of a theft control connected with the ignition switch lock and including a combination switch and lock element controlled by the operation of the ignition switch lock and connected with said ignition switch, means forming part of the theft control for selectively and secretly setting the combination switch and lock element for operation by the turning on of the ignition switch lock, a plurality of control units, a solenoid mechanism connected for operation by any one of said control units for setting of the combination switch and lock element in operation independently of the operation of the ignition switch lock, an alarm means and a lock means connected to one another and to said combination switch and lock element and simultaneously set in operation together with a locking of the ignition switch lock when the ignition switch lock is turned on or when one of said control units is operated, a control mechanism to facilitate release of the combination switch and lock element with a knowledge of the combination for which the theft control is set, and a setting mechanism for holding the combination switch and lock element in a retracted position to permit operation of the ignition switch lock and the closing of the ignition switch without causing operation of the alarm means and the lock means, said setting mechanism also operable to set the combination switch and lock element ready for release by an unauthorized person attempting to steal the automobile by operating either the ignition switch lock or any one of said control units.

CHRIST E. KOLIAS.